United States Patent
Straßer

(10) Patent No.: US 10,490,867 B2
(45) Date of Patent: Nov. 26, 2019

(54) VEHICLE ELECTRICAL SYSTEM FOR A MOTOR VEHICLE AND MOTOR VEHICLE

(71) Applicant: AUDI AG, Ingolstadt (DE)

(72) Inventor: Roman Straßer, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 247 days.

(21) Appl. No.: 15/827,114

(22) Filed: Nov. 30, 2017

(65) Prior Publication Data

US 2018/0159187 A1    Jun. 7, 2018

(30) Foreign Application Priority Data

Dec. 1, 2016    (DE) .......... 10 2016 223 991

(51) Int. Cl.
| | |
|---|---|
| H01M 10/613 | (2014.01) |
| H01M 10/625 | (2014.01) |
| H01M 10/6568 | (2014.01) |
| B60R 16/033 | (2006.01) |

(52) U.S. Cl.
CPC ......... *H01M 10/613* (2015.04); *B60R 16/033* (2013.01); *H01M 10/625* (2015.04); *H01M 10/6568* (2015.04); *H01M 2220/20* (2013.01)

(58) Field of Classification Search
CPC ............. H01M 10/613; H01M 10/625; H01M 10/6568; H01M 10/663; H01M 2220/20
See application file for complete search history.

(56) References Cited

U.S. PATENT DOCUMENTS

| | | | |
|---|---|---|---|
| 6,396,241 B1 | 5/2002 | Ramos et al. | |
| 2011/0318626 A1* | 12/2011 | Bartenschlager | B60H 1/00278 |
| | | | 429/120 |
| 2012/0043935 A1* | 2/2012 | Dyer | B60L 1/003 |
| | | | 320/109 |

FOREIGN PATENT DOCUMENTS

| | | |
|---|---|---|
| DE | 26 41 364 A1 | 3/1978 |
| DE | 30 08 822 A1 | 9/1981 |
| DE | 10 2010 007 975 A1 | 8/2011 |
| DE | 10 2013 201 530 A1 | 7/2014 |
| DE | 11 2012 003 099 T5 | 7/2014 |
| DE | 10 2015 201 440 A1 | 7/2016 |
| EP | 2 073 220 A1 | 6/2009 |
| GB | 2508140 A | 5/2014 |

OTHER PUBLICATIONS

German Search Report dated Sep. 19, 2017 of corresponding German application No. 10 2016 223 991.0; 6 pgs.

* cited by examiner

*Primary Examiner* — Carlos Barcena
(74) *Attorney, Agent, or Firm* — Maier & Maier, PLLC

(57) ABSTRACT

A vehicle electrical system for a motor vehicle. An electrical energy store and at least one component of the vehicle electrical system, this component being connected to the energy store by at least one connection providing at least one electrical line connection to the energy store. A temperature-control fluid can be transported to and/or from the component of the vehicle electrical system that is associated with it by the at least one connection.

9 Claims, 2 Drawing Sheets

VEHICLE ELECTRICAL SYSTEM FOR A MOTOR VEHICLE AND MOTOR VEHICLE

FIELD

The invention relates to a vehicle electrical system for a motor vehicle, comprising an electrical energy store and at least one component of the vehicle electrical system, this component being connected to the energy store by at least one connection means providing at least one electrical line connection to the energy store. In addition, the invention relates to a motor vehicle.

BACKGROUND

Such vehicle electrical systems are used, for example, as high-voltage vehicle electrical systems for supplying an electrical machine for driving a motor vehicle. In this case, a connection means is connected to a component or a specific component of the vehicle electrical system and an energy store on the side of the vehicle electrical system, for producing a conductive electrical connection. Based on the high electrical currents delivered by the energy store and the thermal power loss associated therewith, the components of the vehicle electrical system can be temperature-controlled, in particular cooled, typically by means of a temperature-control fluid. For this purpose, it is known, for example, to provide a temperature-control circuit for the vehicle electrical system, the temperature-control fluid of which can be conveyed to a specific component of the vehicle electrical system via separate fluid connections. Of course, the structural space requirement for such temperature-control circuits is very high, which makes difficult the installation of the vehicle electrical system in the motor vehicle.

Further, a hollow conductor is known from DE 26 41 364 A1 for high-voltage cables, the conductor being composed of a pipe-shaped support element provided with radial passages and several layers of conductive elements disposed on the support element.

DE 30 08 822 A1 discloses a method for cooling a high-voltage cable system, in which a coolant flows through a hollow conductor of one or more cable cores and is conducted in a closed circuit.

EP 2 073 220 A1 discloses a high-voltage bushing comprising an electrical conductor, a pipe-shaped isolator or insulator that surrounds the conductor, and a cooling means for cooling the conductor that comprises at least one cooling element, which extends along a fraction of the length of the conductor and is thermally connected to it.

SUMMARY

The object of the invention is to provide an option that saves structural space for controlling the temperature of a vehicle electrical system of a motor vehicle.

To achieve this object, according to the invention, in a vehicle electrical system of the type named above, it is provided that, in addition, a temperature-control fluid can be transported to and/or from the component of the vehicle electrical system connected to it by means of the at least one connection means.

The invention is based on the consideration of using the connection means providing the electrical line connection between the energy store and the component of the vehicle electrical system also for conveying the temperature-control fluid, and thus to dispense with separate lines for the temperature-control fluid on the side of the component of the vehicle electrical system. Due to this extensive functional integration, the space requirement for installing the vehicle electrical system can be reduced and thus a more economical integration of the vehicle electrical system in the motor vehicle can be achieved.

The vehicle electrical system or the motor vehicle can have a temperature-control device operable by means of the temperature-control fluid, which provides at least one temperature-control circuit for the vehicle electrical system, wherein the at least one connection means forms a segment at least of one of the at least one temperature-control circuit(s). The temperature-control device comprises, for example, a conveying means, such as a pump or a compressor, and/or a heat exchanger for transferring heat from or to the temperature-control fluid. The at least one component of the vehicle electrical system can be heated and/or cooled by means of the temperature-control fluid. The temperature-control fluid is preferably electrically insulating and can be, for example, an insulating oil or a synthetic coolant. The at least one line connection can be insulated, which makes possible the use of a non-insulating temperature-control fluid, in particular.

In the case of the vehicle electrical system according to the invention, it is particularly preferred if at least one of the at least one electrical line connection(s) is designed as a hollow unit, inside of which the temperature-control fluid can be transported. Such a hollow unit can also be called a hollow conductor. The hollow unit can be an electrically conductive pipe, for example, made of metal, through the cavity of which the temperature-control fluid can flow. The hollow unit can have a circular, oval, angular or rounded angular cross section. Alternatively or additionally, at least one of the at least one connection means comprises a flexible tubing or a pipe for transporting the temperature-control fluid. In this case, the electrical line connection can run inside the pipe or the flexible tubing, for example, and the temperature-control fluid can flow around it. Alternatively, the electrical line connection can run outside the pipe or the flexible tubing. In this case, the line connection does not come into contact with the temperature-control fluid.

In the vehicle electrical system according to the invention, preferably at least one of the at least one component(s) of the vehicle electrical system can be connected to two connection means, a first connection means providing a forward run of the temperature-control fluid to the component of the vehicle electrical system, and a second connection means providing a return run of the temperature-control fluid from the component of the vehicle electrical system. In this case, the electrical line connection of one of the two connection means can lie at a high potential of the energy store, and the electrical line connection of the other of the two connection means can lie at a low potential of the energy store, in particular, at ground potential. Alternatively or additionally, a connection means connected to at least one of the at least one component(s) of the vehicle electrical system has fluid channels providing for a forward run of the temperature-control fluid to the component of the vehicle electrical system and a return run of the temperature-control fluid from the component of the vehicle electrical system. In this way a bidirectional transport of the temperature-control fluid can be provided by a single connection means.

In a particularly advantageous embodiment, the at least one connection means on the side of the component of the vehicle electrical system and/or on the side of the energy store has a common connection element for the electrical contacting of the at least one line connection and for transporting the temperature-control fluid in and/or out. The connection element or a specific connection element can be designed, for example, as a plug connector or a screw connector. It may have an electrical contacting segment for the electrical contacting of the line connection with the component of the vehicle electrical system or with the energy store and a fluid-conducting segment, by means of which the temperature-control fluid can be conducted in or out of an opening on the side of the component of the vehicle electrical system or on the side of the energy store. Of course, the connection element may have corresponding seals for this purpose. Such an efficient temperature control of electrical contacting in the connection element can be realized with particular advantage, which could not be realized previously, or could only be realized with great expense by conventional, separate supply lines for a temperature-control fluid.

According to another preferred embodiment of the vehicle electrical system according to the invention, it is provided that the at least one component of the vehicle electrical system has a structural element of the housing taking up the component of the vehicle electrical system, in which the temperature-control fluid can be introduced directly surrounding at least part of the structural element. In other words, the introduction of the temperature-control fluid into the housing is designed such that the housing is flooded completely or at least in segments by the temperature-control fluid. A direct cooling of the structural elements on the inside of the component of the vehicle electrical system is made possible thereby. Therefore, one can dispense with cooling units, cooling plates or cooling fins on which the structural elements are arranged on the side of the vehicle electrical system, and which are thermally coupled with the temperature-control fluid, in order to achieve an extensive reduction in structural space. Alternatively, however, it is also conceivable that the temperature-control fluid can be conveyed through at least one fluid channel on the side of the component of the vehicle electrical system, which is thermally coupled with at least one structural element of the component of the vehicle electrical system that is to be temperature-controlled. Such a fluid channel is disposed, for example, on or in a cooling unit or a cooling plate.

More preferably, some of the structural elements, in particular, control structural elements, are disposed in a housing section separated from a through-flow of the temperature-control fluid. The direct cooling or flooding of the structural elements can therefore be limited to those structural elements that heat up particularly strongly during their operation. For this purpose, the latter are arranged in a housing section that the temperature-control fluid can flow through, while in contrast, those structural elements for which no temperature control is provided are arranged in the separate housing section. The two housing sections can therefore be separated from one another fluid-mechanically.

In addition, in the vehicle electrical system according to the invention, by means of the at least one connection means, the temperature-control fluid can be transported between the energy store, in particular the battery junction box thereof, and the component of the vehicle electrical system. In other words, the temperature-control fluid is transported over the entire length of the connection means between energy store and the component of the vehicle electrical system connected to the connection means. Alternatively, by means of the at least one connection means, the temperature-control fluid can be transported between a distributor unit of the vehicle electrical system and the component of the vehicle electrical system. Such a distributor unit is particularly disposed separate from the energy store and can be a traction network distributor. The battery junction box, thus a connection unit on the side of the energy store for the connection of components of the vehicle electrical system to the energy store, or the distributor unit, in this case, can form a central distributor for the temperature-control fluid and/or accommodate other parts of the temperature-control device, in particular the conveying means and/or the heat exchanger. Alternatively, it is also conceivable that, by means of the at least one connection means, the temperature-control fluid can be transported between at least two components of the vehicle electrical system. In this way, a segregated network can be provided for the transport of the temperature-control fluid.

Preferably, a component of a vehicle electrical system is an electrical machine, particularly inclusive of a power converter unit. The temperature-control fluid, for example, can flow through the power converter unit and a stator and/or a rotor of the electrical machine situated parallel to or behind one another. In particular, with respect to the temperature control of the power converter unit, it is preferred when the power-electronic structural elements thereof are found in the housing section of the power converter unit through which the temperature-control fluid flows, and control structural elements that operate with low voltage and that actuate the power-electronic structural elements are found in the separated housing segment. Alternatively or additionally, a component of a vehicle electrical system may be a d.c. voltage transformer and/or a component of a vehicle electrical system may be a charger. Such a charger may also be called an on-board charger (OBC).

Finally, the vehicle electrical system is preferably equipped for supplying a drive device of the motor vehicle and/or for operating with a voltage of the vehicle electrical system of at least 60 V, preferably at least 200 volts. The vehicle electrical system may also be understood as a high-voltage vehicle electrical system.

The object of the invention is further achieved according to the invention by a motor vehicle comprising a vehicle electrical system according to the invention. All of the statements relating to the vehicle electrical system according to the invention can be transferred analogously to the motor vehicle according to the invention, so that the above-named advantages can also be achieved with the vehicle.

BRIEF DESCRIPTION OF THE FIGURES

Additional advantages and details of the invention result from the examples of embodiment described in the following, as well as based on the drawings. The drawings are schematic representations and show.

DETAILED DESCRIPTION OF THE FIGURES

Figure 1:
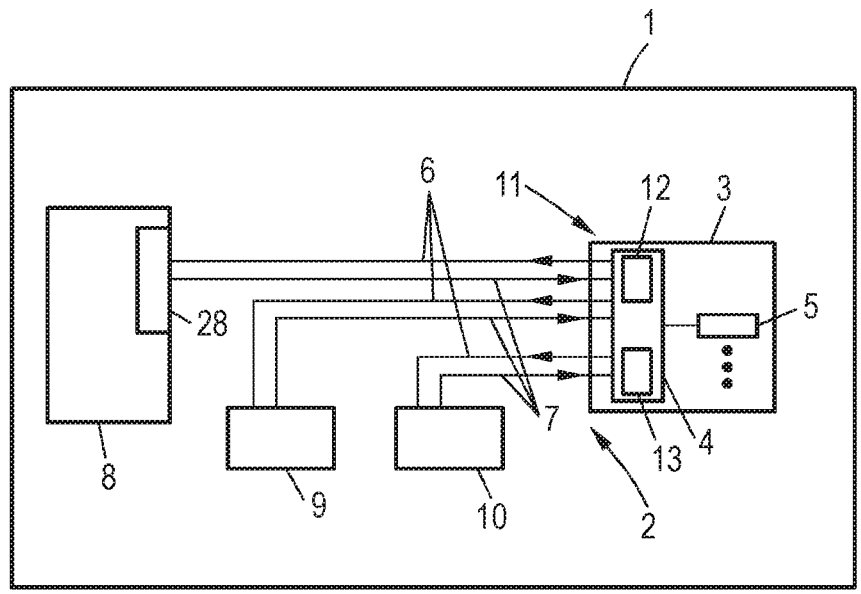
FIG. 1 a schematic diagram of an exemplary embodiment of a motor vehicle according to the invention having a vehicle electrical system according to the invention.

FIG. 1 shows a schematic diagram of an exemplary embodiment of a motor vehicle 1 having a vehicle electrical system 2. The latter comprises an energy store 3 having a battery junction box 4 and a plurality of energy accumulators 5, which provide an output voltage of 200 V, for example, for supplying a drive device of the motor vehicle 1. A component 8 of the vehicle electrical system in the form of an electrical machine of the drive device, a component 9 of the vehicle electrical system in the form of a d.c. voltage transformer, and a component 10 of the vehicle electrical system in the form of a charger 10 are connected to the battery junction box 4 by means of a first connection means 6 and a second connection means 7. The vehicle electrical system 2, however, need not necessarily be a vehicle electrical system equipped for supplying an electrical machine. Alternatively to a battery junction box 4, the vehicle electrical system 2 may also have a distributor unit, for example, a traction network distributor, which is separate from the energy store 3.

Both an electrical line connection between the energy store 3 and the components 8, 9, 10 of the vehicle electrical system as well as a transport of an electrically isolated temperature-control fluid to or from the components 8, 9, 10 of the vehicle electrical system are provided by the connection means 6, 7. In this case, the first connection means 6, for example, is connected to the high potential of the energy store 3, and the second connection means 7 is connected to ground potential. The first connection means 6 serves as the forward run for the temperature-control fluid, and the second connection means 7 serves as the return run, which is shown by arrows in FIG. 1. The connection means 6, 7 are each part of a temperature-control circuit of a temperature-control device 11 of the motor vehicle 1, the device 11 further comprising a conveying means 12, for example, a pump or a compressor, and one or more heat exchangers 13. These are presently integrated into the battery junction box 4, but in alternative exemplary embodiments can also be arranged outside of the energy store 3, for example, in the above-mentioned distributor unit, wherein the temperature-control fluid then flows through the connection means 6, 7 only in segments. According to another exemplary embodiment, the transport of the temperature-control fluid between two components 8, 9, 10 of the vehicle electrical system takes place in the sense of a segregated network.

Figure 2A:
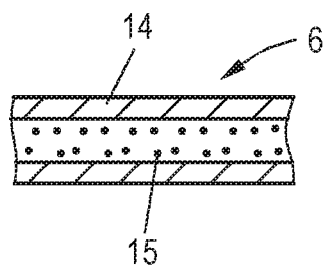
FIG. 2A a longitudinal section through a segment of a connection means for the vehicle electrical system.

FIG. 2A shows a longitudinal section through a segment of the first connection means 6. The electrical line connection between the energy store 3 and the specific component 8, 9, 10 of the vehicle electrical system is provided by a hollow unit 14 in the form of a metal pipe, through the inside 15 of which, i.e., its cavity, can flow the temperature-control fluid, which is shown by the dots in the figures.

Figure 2B:
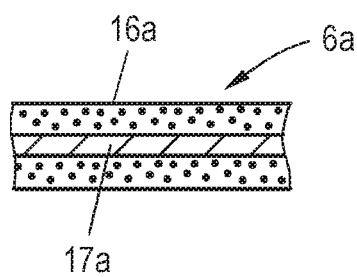
FIG. 2B a longitudinal section through a segment of a connection means for the vehicle electrical system.
Figure 2C:
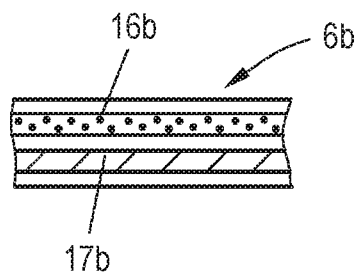
FIG. 2C a longitudinal section through a segment of a connection means for the vehicle electrical system.
Figure 2D:
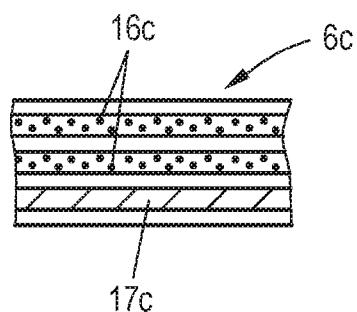
FIG. 2D a longitudinal section through a segment of a connection means for the vehicle electrical system.

FIGS. 2B-D each show longitudinal sections through a segment of alternative embodiments of connection means 6a-c. The connection means 6a according to FIG. 2B comprises a pipe 16a through which can flow the temperature-control fluid, wherein the electrical line connection runs inside the pipe 16a as a solid conductor 17a. FIG. 2C shows a connection means 6b, which comprises a pipe 16b for the transport of the temperature-control fluid, wherein a conductor 17b runs outside the pipe 16. The second connection means 7 can be designed analogously to the above-described first connection means 6, 6a, 6b. FIG. 2D shows a connection means 6c, which has separate pipes 16c in the form of fluid channels for the forward run and the return run, as well as a conductor 17c. In this case, a specific component 8, 9, 10 of the vehicle electrical system can be connected to the energy store 3 by a single connection means 6c, wherein another electrical line connection can be provided for the current feedback. Alternatively, pipes 16a-c can also be flexible tubings. In addition, a connection means corresponding to FIGS. 2B-D can also have a plurality of conductors, for example, one or two conductors for one of at least three phases in each case.

Figure 3:
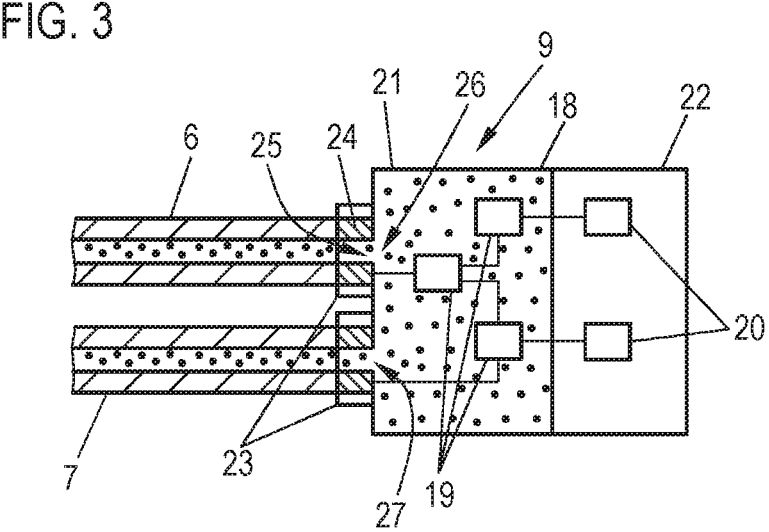
FIG. 3 a detailed illustration of a component of the vehicle electrical system.

FIG. 3 shows a detailed illustration of the component 9 of the vehicle electrical system, which has a plurality of structural elements 19, 20 taken up in a housing 18. In this case, power-electronic structural elements 19 are arranged in a first housing section 21 and control structural elements 20 are arranged in a second housing section 22. The first connection means 6 and the second connection means 7 are each connected to the first housing section 21 via connection elements 23. The connection elements 23 each have a contacting segment 24 for contacting the electrical line connection with the structural elements 19 and a fluid-conducting segment 25, which opens up into openings 26, 27 of the first housing section 21. Through the connection means 6, the temperature-control fluid reaches inside the first housing section 21 via the opening 26 and flows around the power-electronic structural elements 19 therein, thus cooling the elements directly. Via the opening 27, the temperature-control fluid can flow back through the fluid-conducting segment 25 of the connection element 23 into the second connection means 7. The second housing section 22 in this case is separated fluid-mechanically from first housing section 21, so that the control structural elements 20 do not come into contact with the temperature-control fluid. Since the circuit structural elements 20 generate an essentially smaller power loss than the power-electronic structural elements 19, a temperature control by means of the temperature-control fluid can thus be dispensed with.

A corresponding division of housing 21 is also possible for the remaining components 8, 10 of the vehicle electrical system. In particular, in the case of the electrical machine 8, the power converter unit 28 thereof (see FIG. 1) can have two housing sections 21, 22, wherein there is a flow only around semiconductor circuit breakers, but not around actuating control structural elements 20.

According to another exemplary embodiment, the division of the housing 21 is dispensed with. The latter is then completely flooded. According to an alternative example of embodiment, the temperature-control fluid can be conveyed through at least one fluid channel on the side of the component of the vehicle electrical system, this channel being thermally coupled to the structural elements 19 to be temperature-controlled. Such a fluid channel is disposed, for example, on or in a cooling unit or a cooling plate.

The invention claimed is:

1. A vehicle electrical system for a motor vehicle, comprising:
   an electrical energy store and at least one component of the vehicle electrical system, this component being connected to the energy store by at least one connection providing at least one electrical line connection to the energy store, wherein a temperature-control fluid can be transported to and from the component of the vehicle electrical system that is associated with it by the at least one connection.

2. The vehicle electrical system according to claim 1, wherein at least one of the at least one electrical line connection(s) is designed as a hollow unit, on the inside of which the temperature-control fluid can be transported, and at least one of the at least one connection includes a flexible tubing or a pipe for transporting the temperature-control fluid, wherein the electrical line connection runs inside or outside the pipe or the flexible tubing.

3. The vehicle electrical system according to claim 1, wherein at least one of the at least one component(s) of the vehicle electrical system is associated with two connections, wherein a first connection provides a forward run of the temperature-control fluid to the component of the vehicle electrical system and a second connection provides a return run of the temperature-control fluid from the component of the vehicle electrical system, and a connection connected to at least one of the at least one component(s) of the vehicle electrical system has fluid channels providing a forward run of the temperature-control fluid to the component of the vehicle electrical system and a return run of the temperature-control fluid from the component of the vehicle electrical system.

4. The vehicle electrical system according to claim 3, wherein at least one connections on the side of the component of the vehicle electrical system and on the side of the energy store has a common connection element for the electrical contacting of the at least one line connection and for transporting the temperature-control fluid in and out.

5. The vehicle electrical system according to claim 4, wherein the at least one component of the vehicle electrical system has a structural element of the housing taking up the component(s) of the vehicle electrical system, in which the temperature-control fluid can be introduced directly surrounding at least some of the structural elements.

6. The vehicle electrical system according to claim 5, wherein some of the structural elements are disposed in a housing section separated from a through-flow of the temperature-control fluid.

7. The vehicle electrical system according to claim 6, wherein the temperature-control fluid can be transported by the at least one connection between the energy store, and the components of the vehicle electrical system, or between a distributor unit of the vehicle electrical system and the components of the vehicle electrical system, or between at least two components of the vehicle electrical system.

8. The vehicle electrical system according to claim 7, wherein a component of the vehicle electrical system is an electrical machine, particularly inclusive of a power converter unit, and a component of the vehicle electrical system is a d.c. voltage transformer, and a component of the vehicle electrical system is a charger.

9. The vehicle electrical system according to claim 8, wherein it is equipped for supplying a drive device of the motor vehicle and for operating with a vehicle electrical system voltage of at least 60 volts.

* * * * *